United States Patent [19]

Antes et al.

[11] Patent Number: 4,984,824
[45] Date of Patent: Jan. 15, 1991

[54] DOCUMENT WITH AN OPTICAL DIFFRACTION SAFETY ELEMENT

[75] Inventors: Gregor Antes, Zurich; Christian Saxer, Urdorf, both of Switzerland

[73] Assignee: LGZ Landis & Gyr Zug AG, Zug, Switzerland

[21] Appl. No.: 311,596

[22] Filed: Feb. 15, 1989

[30] Foreign Application Priority Data

Mar. 3, 1988 [CH] Switzerland .................. 805/88

[51] Int. Cl.$^5$ ............................................ B42D 15/00
[52] U.S. Cl. .................................... 283/91; 350/3.61; 283/904
[58] Field of Search ............. 283/91, 72, 85, 86, 283/901, 904; 350/3.6, 3.61, 3.7, 3.73, 162.17, 162.18, 162.2, 162.23; 356/71

[56] References Cited

U.S. PATENT DOCUMENTS

| | | | |
|---|---|---|---|
| 3,819,911 | 6/1974 | Greenway | 350/3.6 |
| 3,894,756 | 7/1975 | Ward | 350/3.61 |
| 4,184,700 | 1/1980 | Greenaway | 283/6 |
| 4,402,571 | 9/1983 | Cowan et al. | 350/3.61 |
| 4,417,784 | 11/1983 | Knop et al. | 283/91 X |
| 4,563,024 | 1/1986 | Blyth | 283/91 |
| 4,568,141 | 2/1986 | Antes | 350/3.61 |
| 4,652,015 | 3/1987 | Crane | 283/91 |
| 4,725,111 | 2/1988 | Weitzen et al. | 350/3.6 |
| 4,735,670 | 4/1988 | Maurer et al. | 156/272.8 |
| 4,761,253 | 8/1988 | Antes | 264/1.3 |
| 4,790,566 | 12/1988 | Boissier et al. | 283/91 |
| 4,814,594 | 3/1989 | Drexler | 283/904 |
| 4,892,385 | 1/1990 | Webster, Jr. et al. | |

FOREIGN PATENT DOCUMENTS

| | | | |
|---|---|---|---|
| 0178232 | 4/1986 | European Pat. Off. | |
| 3206062 | 8/1982 | Fed. Rep. of Germany | |
| 3442795 | 6/1985 | Fed. Rep. of Germany | 283/91 |
| 1574614 | 9/1980 | United Kingdom | 283/91 |

OTHER PUBLICATIONS

Caulfield, "The Wonder of Holography", National Geographic, vol. 165, No. 3, Mar. 1984, p. 364.

*Primary Examiner*—Paul A. Bell
*Attorney, Agent, or Firm*—Marmorek, Guttman & Rubenstein

[57] ABSTRACT

A document with an embossed macroscopic structure and acting through optical diffraction is disclosed. The structure, which serves as a security element comprises a plurality of surface portions with predetermined relief structures having spatial frequencies of over 10 lines/mm. Each surface portion is different from directly adjoining surface portions and at least some of the surface portions have a maximum dimension of less than 0.3 mm. To the naked eye, the pattern of surface portions on the document appears as a mesh of dots and lines. However, to an examiner with a magnifying device, the dots and lines appear as numbers, characters or other graphic features.

11 Claims, 1 Drawing Sheet

DOCUMENT WITH AN OPTICAL DIFFRACTION SAFETY ELEMENT

FIELD OF THE INVENTION

The present invention relates to a document with a difficult to forge optical-diffraction security element usable for providing information as to authenticity, especially for securities, identity papers, payment means and similar objects to be protected. The present invention also relates to a process for the manufacture of the optical-diffraction security element.

BACKGROUND OF THE INVENTION

It must not be possible to duplicate documents. Modern documents are therefore provided with security elements, which for instance, render information as to the authenticity of the protected document visible even to an untrained layman through diffraction of the ambient light. Such a document including an optical-diffraction type security element and a process for its production is described in U.S. Pat. No. 4,184,700 which is equivalent to Swiss Patent specification CH-PS No. 594,936.

Diffraction of light is illustratively obtained from optical coatings with embossed grid structures which are straight-line relief structures in their simplest form. The diffraction properties of these relief structures are determined, among other factors, by the spatial frequency, i.e. the number of lines per millimeter, by the cross-sectional form of the relief structure and by the differences in height within the relief structure as well as by the orientation of the relief structure on the document.

The U.S. Pat. No. 4,892,385 describes a security element with a diffracting structure which is composed of surface portions with varying structural parameters. Each individual surface portion is at least large enough so that light which falls on the surface portion is split into its color components in a characteristic manner and is recreated at a distance of 30 cm separate bundles of characteristic color are created at a solid angle of at least 2 milliradians, i.e. approximately 7 minutes of a degree of arc. These surface portions are therefore easy to recognize with the naked eye and stand out from adjoining surface portions through contrasting colors, for instance.

If the relief structure grid parameters change continuously, or in small steps within the diffracting structure from surface portion to surface portion, color impressions moving along a predetermined path are created on the document for the eye of the viewer when the position of the document in relation to the source of light and to the naked eye is changed. Documents of this type are described in EP (European patent) No. 105 099 which is equivalent to U.S. Pat. No. 4,568,141.

These security elements can be produced economically by shaping a layer of synthetic material with an embossing stamp capable of being heated and supporting the negative of the security element, said negative having been galvanically formed by a master structure.

The manner of producing this master structure is known from EP 169 326 which is equivalent to U.S. Pat. No. 4,761,253. A layer of synthetic material is elastically shaped in a small, circular zone by a matrix which supports a predetermined relief structure. The surface facing the matrix is heated locally by means of localized radiation until the synthetic material is softened in a surface area limited by the localized radiation and the relief structure is transferred to the surface. A master structure produced in this manner can comprise of a great number of surface portions which vary in their diffraction properties from adjoining surface portions. Forgery is made much more difficult by the great number of surface portions diffracting light in different ways.

The object of the instant invention is to create a document of the type mentioned initially, as well as a device for its production, with a structure which can be copied or forged only at great expense, which has lines and surface portions visible without any device through visual observation and with additional graphic features that cannot be seen without a (magnifying) device.

SUMMARY OF THE INVENTION

The present invention is a document which includes an embossed structure acting through optical diffraction. The embossed structure serves as a security element and comprises a plurality of surface portions with predetermined relief structures. The relief structure of each surface portion has a spatial frequency which is larger than 10 lines/mm and each surface portion is different from directly adjoining surface portions. At least some of the surface portions have a maximum dimension of less than 0.3 mm. When such dimensions are utilized, to the naked eye, the pattern of surface portions on the document appears as a mesh of dots and lines when illuminated with light. However, to an examiner with a magnifying device, the pattern appears, as numbers, characters or other graphic features.

Thus, a document including such an embossed structure is particularly difficult to forge, as there are two levels of security. One level of security is the pattern which can be seen with the naked eye. The second level of security is the pattern which can be seen only with a magnifying device.

DETAILED DESCRIPTION OF THE INVENTION

Figure 1:
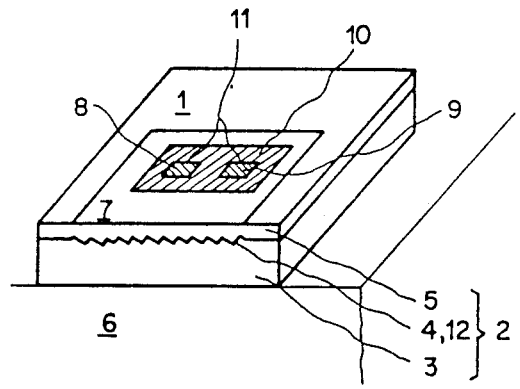
FIG. 1 is a schematic representation of a document including a plurality of light-diffracting surface portions in accordance with an illustrative embodiments of the present invention.

A document 1 is shown in FIG. 1, whereby part of document 1 is cut off for the sake of greater clarity. Surface 2 therefore shows document 1 in cross-section. The document 1 comprises a substrate 3 with an optical coating 4 and a transparent protective layer 5.

The optical coating 4 is typically a thin metal or dielectric layer with a thickness in the order of 100 nm, but the optical effect can also be produced by a difference between the refractive index of the protective layer 5 and of the substrate 3 alone.

Substrate 3 can for example be a plastic film to be attached on an object 6 to be protected. If the object 6 to be protected is a piece of paper, a film or a fabric, substrate 3 can also take the form of a plastic layer applied directly on this background by a printing method as described in the aforementioned U.S. Pat. No. 4,184,700. If the object 6 to be protected is itself made of a synthetic material, it can be used directly as substrate 3, i.e. the document 1 and the object 6 to be protected constitute an inseparable unit. Document 1 is difficult to forge or to copy and serves as a proof of authenticity for identity documents, payment means, securities, documents, etc.

For example, a macroscopic structure 7 acting through optical diffraction is embossed by means of a heated die before or after application of an optical coating 4 onto the substrate 3. The wavelength of the light used for the viewing of the diffraction effect and the selection of the materials for the substrate 3, for the optical coating 4 and for the protective layer 5 determine whether the structure 7 acting through optical diffraction is a phase or an amplitude grid or whether structure 7 must be viewed in transmission or in reflection. A combination of both types of grids and/or of both manners of viewing is also possible.

Structure 7 has a great number of surface portions 8, 9, 10, with microscopic relief structures 12. A border 11 separates each surface portion 8, 9, 10 from the others, whereby the border 11 is only a means of describing the shapes of the individual surface portions 8, 9, 10 and to render them visible in the drawing. In reality, each of the surface portions 8, 9, 10 is defined by the type and by the orientation of its relief structure 12. When the document 1 is viewed, the surface portions 8, 9, 10 differentiate themselves from each other through the shapes of their borders 11 and through their diffraction effects which ar determined by the selection of parameters and by the orientation of the embossed relief structure 12.

As an example, the relief structures 12 can have cross-sectional configurations of known periodic functions with spatial frequencies of over 10 lines per millimeter which are effective for the diffraction of visible light. Limits which are imposed by production imperatives restrict the practical, usable range to approximately 2,500 lines per millimeter. But cross-sectional configurations with aperiodic functions containing local spatial frequencies within that range, such as for example mat structures, can however also be used. The differences in height within the relief structure 12 lie typically between 50 nm and 10,000 nm.

Figure 2:
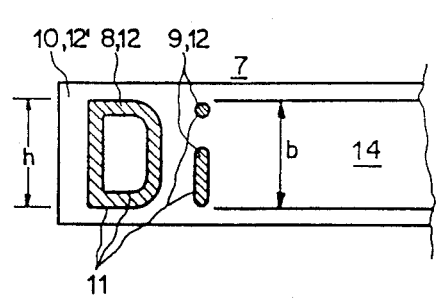
FIG. 2 shows examples of light-diffracting surface portions in accordance with an illustrative embodiment of the present invention.

In an embodiment of document 1 according to FIG. 2, the surface portions 8 and 9 are surrounded by a surface portion 10 of structure 7. The surface portion 8 for example, is different from the adjoining surface portions 9 only through their respective forms as defined by the border 11, while the surface portion 10 stands out from the two immediately adjoining surface portions 8 and 9 through a second relief structure 12' with diffraction effects differing from those of the relief structure 12. The surface portion 8 or 9 could for instance represent a number or some other feature which is different from surface portion 10 because of the intensity and the color of the surface portion 10 when the document 1 is viewed.

A normally sighted human eye recognizes the features of surface portions 8 and 9 without the use of any device, on condition that they appear under a viewing angle of somewhat over 1 minute of a degree of arc. At the normal viewing distance to the eye of approximately 25 cm, the naked, normally sighted human eye therefore sees features without difficulty if the details which define surfaces are at distances of over 0.1 mm from each other. The dimensions of the surface portions 8 and 9 themselves must therefore be measured in multiples of 0.1 mm so that their forms, representing a character for example, may be distinguished.

Figure 3:
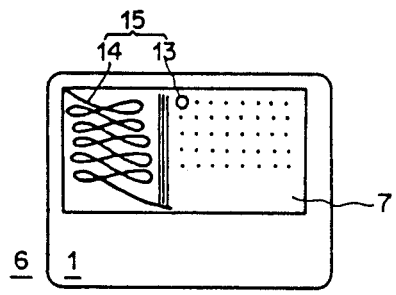
FIG. 3 shows a visual image appearance of a document of the type shown in FIG. 1.

If the largest dimension of a surface portion 8, 9 measures 0.3 mm or less, the naked human eye sees it at the normal viewing distance, depending upon the degree of contrast, only as a shapeless point 13 (FIG. 3) on the document 1.

In FIG. 2, several surface portions 8, 9 are aligned in a row to a maximum height h, whereby the distance between the surface portions is less than 0.3 mm and therefore less, at normal viewing distance, than the distance that would be necessary at the minimum viewing angle. To the naked eye, they form a line 14 with a width b that is equal to the height h on the document 1. If width b is less than 0.3 mm, line 14 is provided with an unobtrusive, formless border.

The surface portions 8, 9 can be so small that their surfaces defined by border 11 can form a character, a number or some other graphically formed feature, for example, while the largest dimension in form of width b or height h does not exceed approximately 0.3 mm. Therefore the surface portions 8, 9, if they are seen at all, are perceived as dots 13 (FIG. 3) or lines 14.

With these dots 13 and these lines 14 as the grid elements, it is possible to constitute macroscopic patterns 15 on the document 1 which is easily recognized by the naked eye, with no limits set to the designs of these patterns 15.

The naked eye distinguishes pattern 15 (see FIG. 3) against the background of the diffraction effects of structure 7 produced in the other surface portions 10 only in a play of colors and luminosity dependent upon the viewing and illumination conditions and determined by the diffraction on the relief structures 12, 12'.

For example, on document 1, in a model designed for a bank note, a national emblem is contained in every dot 13 and texts are contained in every line 14, whereby the latter give an indication of the issuer or of the face value. These additional data can only be recognized when the diffracting structure 7 is viewed through a simple magnifying glass. With this device, an examiner can recognize characters, numbers or other features that are hidden in the dots 13 or in the lines 14 and which thus give an assurance of the authenticity of the document 1.

Figure 4:
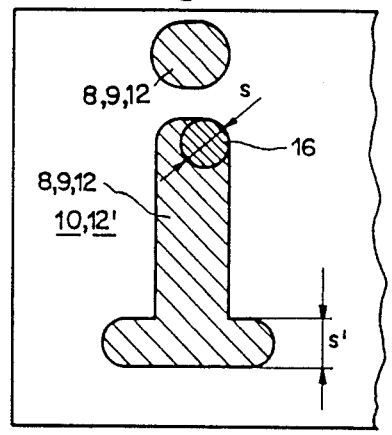
FIG. 4 shows an enlarged detail of a surface portion of FIG. 2

For characters, numbers or features whose greatest dimension is less than 0.3 mm, strokes (FIG. 4) of less than 60 $\mu$m in width are required so that they may be properly formed. The surface portions 8, 9 are composed of circular surface elements 16 with a diameter s, equal to the finest stroke width s'. A greater stroke width s' may be composed of the surface element 16 used for the finest stroke widths and overlapping each other, such as for example in the letter "i" in FIG. 4.

An identical orientation and identical parameters of the relief structure 12 in all surface portions 8, 9 which are different from the second relief structure 12' of the surface portion 10 promotes ease of recognition advantageously. The examiner armed with a magnifying glass recognizes such surface portions 8, 9 of same color and same luminosity which stand out in color and luminosity from the surrounding surface portion 10.

A group of characters (FIG. 2) can be repeated several times on one line 14. For example, a group may spell out a sentence, whereby the surface portions 8, 9 distinguish themselves for each word of the sentence through a different relief structure 12, so that each word appears in a different color and with a different luminosity.

To mass-produce such documents 1 efficiently (FIG. 1) the preferred embossing processes are those in which a heated embossing matrix plastically shapes the surface of substrate 3.

Figure 5:
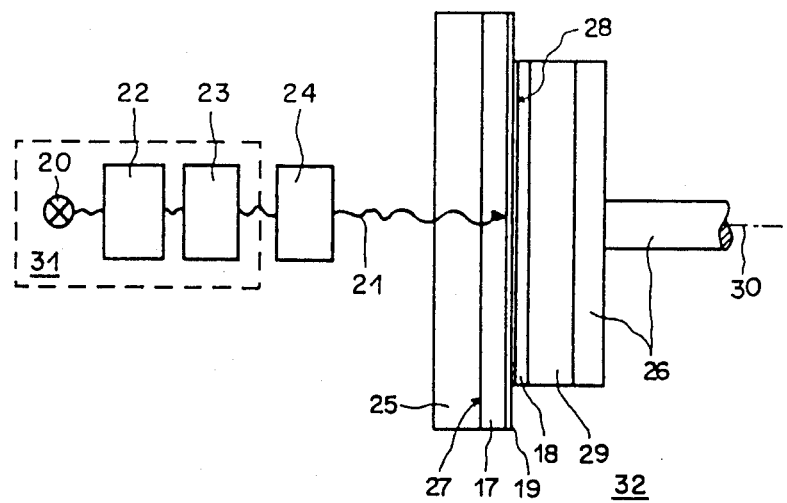
FIG. 5 shows a device for the production of a master structure for a document of the type shown in FIG. 1.

To produce the embossing matrix, a master structure is advantageously made on a support 17 by means of a device shown in FIG. 5 and a negative is then taken galvanically from this master structure to be then used as the embossing matrix. The device transfers one surface element 16 (FIG. 4) after the other from an unheatable matrix 18 to a thermoplastic cover layer 19 of the support 17.

The device can comprise, for example, a radiation source 20 emitting electromagnetic radiation 21, a modulator 22 for the intensity of the radiation 21, a focusing means 23, a ray deflection device 24, a rigid, flat surface 25 for the support 17 of the thermoplastic cover layer 19 and a means 26 to press the matrix 18 against the cover layer 19 which is located between itself and the support 17.

It is also possible to use the surface 25 directly as the support 17 of the cover layer 19, in order to avoid reflection losses on their common interface 27. The surface 25 is desirably easy to replace in that case.

The matrix 18 may be designed so as to be rigid or flexible and is provided with a microstructure 28 with an area of a few square centimeters in the surface facing the cover layer 19. In order to compensate for unevenness in the cover layer 19 and to achieve uniform distribution of pressure of the cover layer 19, a flexible matrix 18 made of a thin metal film is preferably used. A pressure-producing means 26 bears upon the back of the matrix 18 through a flexible intermediary layer 29.

The means 26 presses the unheated matrix 18 with its surface supporting the microstructure 28 against the thermoplastic cover layer 19 in such manner that the microstructure 28 deforms the cover layer 19 elastically over the entire contact surface.

The electromagnetic radiation 21 penetrates through the transparent surface 25 and through the transparent support 17. The focusing means 23 concentrates the electromagnetic radiation 21 into a focal point in the plane of the thermoplastic cover layer 19. The illuminated spot can be shifted in the plane of cover layer 19 by means of the ray deflection device.

Appropriate means such as colorants or carbon black absorb in the cover layer 19 the radiation 21 which is controlled in intensity by means of the modulator 22 to heat the thermoplastic cover layer 19 locally at the illuminated spot. The cover layer 19 softens within surface element 16 (FIG. 4), whereby the heat dissipation effected by the support 17 (FIG. 5) and the matrix 18, the radiation energy and the duration of the action of the radiation 21 determine the diameter s (FIG. 4) of the surface element 16. The local pressure of the matrix 18 (FIG. 5) is sufficient to plastically shape the hot cover layer 19 locally (i.e. in the spot illuminated by the radiation). Controlled by such devices as the ray deflection device 22 for example, the illuminated spot in the cover layer 19 wanders on, or the radiation 21 is switched off by the modulator 22. As soon as the radiation 21 no longer acts upon the surface element 16 (FIG. 4) the surface cover 19 (FIG. 5) solidifies again and now has a permanent reproduction of the microstructure 28 at that location.

A laser is used to advantage as the source of radiation 20. To reproduce the microstructure 28, the radiation 21 can be focused in the entire plane of the cover layer 19 precisely so that the illuminated spot warms the cover layer 19 in the surface element 16 (FIG. 4), the diameter s of which measures less than 60 $\mu$m.

By using the described device it is possible to produce stroke widths s' of less than 60 $\mu$m, since there are no lateral mechanical forces which could shift matrix 18 in an uncontrollable manner during reproduction of the microstructure 28 and would therefore set a lower limit of radiation 21 (FIG. 5) in spite of good focusing. Stroke widths s' (FIG. 4) of less than 60 $\mu$m are necessary to produce characters, numbers and other graphical design features if the naked human eye should no longer be able to recognize them. The speed of writing is influenced by the intensity of radiation 21 (FIG. 5) at the focal point.

In a first step the device places a group of surface portions 8, 9, 10 (FIG. 2) of structure 7 successively into the master structure. The group is characterized as having the identical orientation and identical parameters for the relief structure 12 or 12'.

In a second embodiment of the device, a diaphragm, pin hole or iris diaphragm (not shown here) in the modulator 22 is optically reproduced by means of the focusing means 23 on the cover layer 19 and heats said cover layer 19 in a diaphragm image for the reproduction of microstructure 28. This device also produces surface elements 16 (FIG. 4) with a diameter s and stroke widths s' of over 60 $\mu$m and accelerates the production of the master structure.

In a third embodiment of the device the group of all surface portions 8, 9, 10 of structure 7 with an identical orientation and identical parameters for the relief structure 12, 12' are placed simultaneously into the master structure. Instead of the pin diaphragm, a diaphragm with cut out shapes of this group are used and are optically reproduced for that purpose by means of the focusing means 23 (FIG. 5) on the cover layer 19, whereby a preferably impulse-like radiation heats up the cover layer 19 in all illuminated locations of the diaphragm image at the same time so that copies of the microstructure 28 remaining there are reproduced in the master structure.

The diaphragms can be replaced in the modulator 22 and are mounted rotatably in order to achieve maximum flexibility of the device.

The matrix 18 is then lifted off from the cover layer 19, is rotated around an axis 30 which is perpendicular to the plane of matrix 18, is shifted laterally or is replaced by a matrix 18 with a different microstructure 28.

In the following steps additional groups of surface portions 8, 9, 10 (FIG. 4) are transferred by means of one of the above-described method, whereby surface elements 16 of the cover layer 19 (FIG. 5) can again be shaped. This process of form reproduction is repeated until all surface portions 8, 9, 10 (FIG. 1) of structure 7 have been produced.

In a fourth embodiment of the device a controllable drive, instead of the ray deflection device 24 (FIG. 5), produces a relative mechanical movement between a source of radiation 31 comprising components 20; 22 and 23 and an aggregate 32 comprising components 17; 18; 19; 25; 26 and 29, whereby the illuminated location, i.e. the focal point or the diaphragm image is shifted in the plane of the cover layer 19.

Only a few of the expensive matrixes 18 are sufficient with this device to produce an unlimited number of different master structures.

Finally, the above-described embodiments of the invention are intended to be illustrative only. Numerous alternative embodiments may be desired without departing from the spirit and scope of the present invention.

We claim:

1. A document comprising
   an embossed microscopic structure which operates through optical diffraction to serve as a security element for preventing unauthorized copying, said embossed structure including numerous surface portions,
   each of said surface portions having a predetermined relief structure with a spatial frequency larger than 10 lines/mm, each relief structure of each surface portion being different from that of adjoining surface portions, and
   a group of said surface portions having a predetermined geometric shape which carries security information and a largest dimension of less than 0.3 mm.

2. The document of claim 1 wherein said geometric shape of each surface portion of said group forms a character.

3. The document of claim 1 wherein said surface portions of said group are aligned in a row whereby the distance between them is less than 0.3 mm, said row forming a straight or curved line when viewed with the naked eye.

4. The document of claim 1 or 3 wherein said group of surface portions forms a predetermined macroscopic pattern of lines and dots which are each formed by one of said geometric shapes when viewed with the naked eye.

5. The document of claim 1 wherein said group of surface portions forms a predetermined macroscopic pattern of lines and dots when viewed with the naked eye, and a second determined pattern of geometric shapes when viewed with a magnifying device.

6. The document of claim 1 wherein said structure is embossed in a plastic film to be applied to an object to be protected.

7. The document of claim 1 wherein said structure is formed in a layer which is applied by a printing method.

8. A security element for preventing unauthorized copying which operates by diffracting light comprising:
   a plurality of embossed surface portions, each of said embossed surface portions having a predetermined relief structure with a spatial frequency larger than 10 lines/mm for diffracting incident light;
   each relief structure of each surface portion being different from the relief structure of directly adjoining surface portions;
   one group of said surface portions having a predetermined geometric shape for carrying security information and having a largest dimension less than 0.3 mm to provide a first pattern which can be seen with the naked eye and a second pattern which can be seen only with a magnifying device.

9. A security element for preventing unauthorized copying comprising
   an embossed microscopic structure which operates through optical diffraction, said embossed structure including numerous surface portions,
   each of said surface portions having a predetermined relief structure with a spatial frequency larger than 10 lines/mm, each relief structure of each surface portion being different from that of adjoining surface portions, and
   a group of said surface portions having predetermined geometric shape for carrying authenticity information and a largest dimension of less than 0.3 mm, said group of surface portions standing against a background by the color and luminosity of radiation diffracted thereby.

10. A document comprising
    an embossed microscopic structure which operates through optical diffraction to serve as a security element for preventing unauthorized copying, said embossed structure including numerous surface portions,
    each of said surface portions having a predetermined relief structure with a spatial frequency larger than 10 lines/mm, each relief structure of each surface portion being different from that of adjoining surface portions, and
    a group of said surface portions having a predetermined geometric shape for carrying authenticity information and a largest dimension of less than 0.3 mm, said relief structures of said group of surface portions having the same orientation and spatial frequency to increase the visibility of said group when a magnifying device is utilized.

11. A document comprising
    an embossed microscopic structure which operates through optical diffraction to serve as a security element for preventing unauthorized copying, said embossed structure including numerous surface portions,
    each of said surface portions having a predetermined relief structure with a spatial frequency larger than 10 lines/mm, each relief structure of each surface portion being different from that of adjoining surface portions, and
    one group of said surface portions having a largest dimension less than 0.3 mm to provide a first pattern of lines and dots which can be seen with the naked eye and a second pattern which can be seen only with a magnifying device, said group of surface portions having relief structures with the same orientation and spatial frequency.

* * * * *